United States Patent [19]

Tadewald

[11] 4,286,143

[45] Aug. 25, 1981

[54] HEATER ASSEMBLY

[75] Inventor: Thomas D. Tadewald, La Crosse, Wis.

[73] Assignee: UOP Inc., Des Plaines, Ill.

[21] Appl. No.: 93,476

[22] Filed: Nov. 13, 1979

Related U.S. Application Data

[62] Division of Ser. No. 939,764, Sep. 5, 1978.

[51] Int. Cl.$^3$ .............................................. H05B 3/68
[52] U.S. Cl. .................................. 219/443; 219/345; 219/386; 219/544; 219/548; 338/254
[58] Field of Search ............... 219/443, 548, 544, 385, 219/386, 436, 438, 445, 455, 457, 458, 459, 460, 462, 464, 466–468; 338/252, 254, 256

[56] References Cited

U.S. PATENT DOCUMENTS

| 2,152,126 | 3/1939 | Young | 219/443 |
| 2,640,906 | 6/1953 | Haynes | 219/445 |
| 2,643,320 | 6/1953 | Pfenninger, Jr. | 338/254 |
| 2,843,711 | 7/1958 | Crick | 338/254 |
| 2,952,761 | 9/1960 | Smith-Johannsen | 219/541 |
| 2,961,524 | 11/1960 | Newman | 219/541 |
| 3,218,436 | 11/1965 | Edwards et al. | 219/544 |
| 3,436,816 | 4/1969 | Lemelson | 219/345 |

FOREIGN PATENT DOCUMENTS 50-40252 12/1975 Japan ...................................... 219/548

Primary Examiner—E. A. Goldberg
Assistant Examiner—Bernard Roskoski
Attorney, Agent, or Firm—James R. Hoatson, Jr.; Barry L. Clark; William H. Page, II

[57] ABSTRACT

Laminated heater plate assembly is formed from a plurality of layers of glass cloth and/or glass mat and epoxy resin which are laminated together under heat and pressure. One or more thermally conductive heater members are mounted in a cut-out region(s) in a pre-cured or "C" stage laminate top portion of the assembly while a plurality of uncured or "B" stage glass mat and epoxy resin laminations are stacked, assembled under the "C" stage portion and heater portion(s), and bonded to each other into a rigid, warp-free heater plate assembly which can be repeatedly subjected to steam or hot water without damage. Preferably, the resin density after bonding in the region of the edges of the heater portion(s) and the adjacent surrounding edges of the cut-out region(s) is greater than in locations spaced further from the heater portion(s) in order to enhance the sealing of the assembly in the most critical areas thereof. In a preferred embodiment the weight of the assembly is reduced by the use of micro-balloons in some laminations, the absence of epoxy in others, and by the elimination of portions of the interior layers.

7 Claims, 5 Drawing Figures

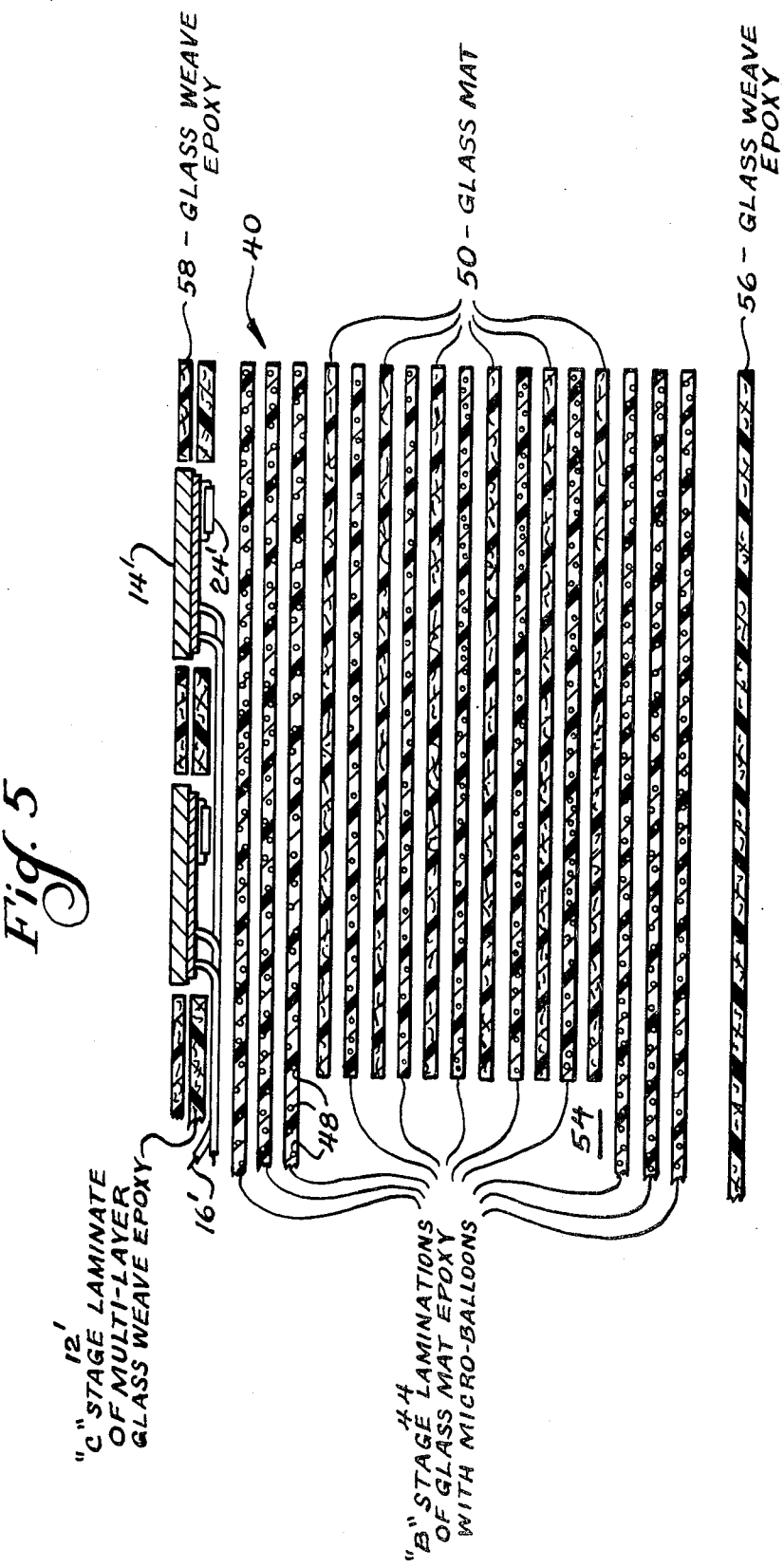

HEATER ASSEMBLY

This is a division of application Ser. No. 939,764, filed Sept. 5, 1978.

BACKGROUND OF THE INVENTION

The invention relates to electric heating members and particularly to such members as must necessarily be periodically exposed to hostile environmental conditions such as steam, hot water and chemicals. One example of such an environment is disclosed in Colato et al U.S. Pat. No. 4,005,745 where an institutional feeding apparatus is disclosed. The disclosed apparatus includes a cabinet-like cart whose interior is refrigerated and which contains a plurality of semi-permanently mounted heater plates which are adapted to heat food containers positioned on a food tray located immediately above each heater plate. The carts must be washed after each use with a steam or hot water spray and germicidal solutions. Where the heater plates are not perfectly sealed, moisture can get inside them where expansion and contraction with temperature changes can further harm the seals and cause short circuits in the heater elements.

SUMMARY OF THE INVENTION

It is among the objects of the present invention to provide an improved heater assembly and method of making same which will adequately protect the heater from damage in a variable temperature moist environment, which will remain stable, and which will be resistant to wear caused by repeated sliding contact with trays and containers.

These and other objects are attained by the heater plate assembly and method of making same of the present invention. The heater plate assembly basically comprises a laminated stack of glass cloth and/or glass mat sheets and a suitable thermosetting polymeric binder such as epoxy. The upper portion of the assembly has cut-out portions which accommodate one or more heater plate portions while the heater wiring and associated saftey devices are preferably encapsulated within the stack. The heater elements per se may be of any type suitable for the purpose and may, for example, include: etched heating elements; resistive wire elements; resistive metal elements; resistive powdered metal and binder elements; carbon semi-conductor type elements; pyropolymer type elements of the type disclosed in my U.S. Pat. No. 3,973,103; or mixtures of the above.

In a preferred embodiment wherein the heater plate assembly is formed so as to have a minimum weight for a predetermined thickness, the alternate inner layers of the laminate comprise sheets of glasss mat which are not coated with epoxy. The remaining inner layers comprise "B" stage or uncured epoxy coated glass mat sheets in which glass balloons are encapsulated in the epoxy to reduce its weight. The "B" stage sheets are also called "pre-preg" sheets since they are partially cured to a dry state after being coated with liquid resin. The outer upper layers and the bottom layer preferably comprise sheets of glass woven cloth and epoxy to insure a seal against the entry of moisture and to maintain stability against warping. The upper layer is preferably in a "C" stage or cured state before assembly and lamination of the complete assembly. Preferably, the heating elements in the assembly are more thermally conductive than the adjacent areas of the laminate which immediately surround their edges and within which they are recessed. Thus, when the assembly is laminated, and subjected to heat and pressure, the heater elements, which are preferably formed with a stainless steel body, will become hot faster than the adjacent areas and will cause the dry epoxy in the "B" stage layers to turn to liquid and fill the gaps around the heater plates before the more remotely positioned epoxy can be liquefied and begin to flow out the sides as flash. Thus, good distribution and bonding is achieved with the epoxy being especially rich in the areas of the heaters where it is most needed to insure good sealing. With sealing in the most critical areas assured, it is possible to achieve further weight reductions by eliminating the epoxy from several alternate layers in the center region of the stack. It is also possible to completely cut away portions of many, if not most, of the center region layers in those areas of the plate assembly where no heater plates are located. The principal weight saving is achieved by placing glass micro-balloons in the epoxy which is applied to the "B" stage layers. Suitable balloons are sold by 3-M Company as Glass Bubbles #B15/205 and have a size such that 90% fall between 30–130 microns. They have a crushing strength of 250 psi and a density of 0.12–0.18 g/cc.

In a typical glass mat and resin "B" stage layer the resin can be approximately 65–80% of the weight. By the addition of 10–20% micro-balloons to the resin (0.2 g/cc) the weight of the "B" stage can be reduced to about 20–40%. However, the net weight reduction of the final laminate after the application of heat and pressure during curing of the "B" stage is only about 25% of the original weight reduction. This is due to the fact that the balloons tend to readily flow out of the resin and into the flash which forms around the edges during pressing. Since the micro-balloons produce some porosity in the finally cured product, the top and bottom layers of the heater assembly are preferably made without micro-balloons. To facilitate assembly, the top portion of the assembly comprises a "C" stage laminate of woven glass cloth and epoxy having a thickness of about 0.032" which is routed out to form openings where the heater plates are to be.

BRIEF DESCRIPTION OF THE DRAWING

FIG. 5 is a view similar to FIG. 3 but showing a preferred embodiment of the invention which has less weight for a given thickness than the embodiment of FIG. 2.

DESCRIPTION OF THE PREFERRED EMBODIMENTS

Figure 1:
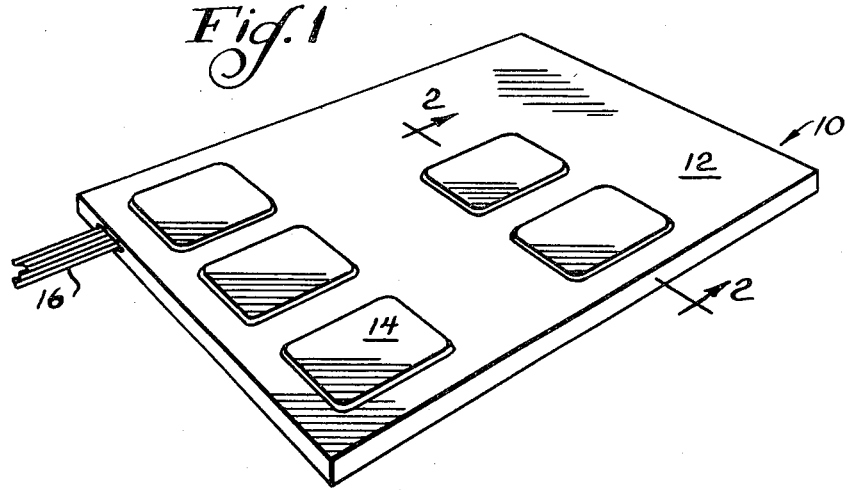
FIG. 1 is a perspective view of a heater plate assembly containing multiple heater elements.

FIG. 1 shows a perspective view of a heater plate assembly indicated generally at 10 and having an upper surface 12 which is recessed at various locations to accommodate a plurality of heater elements 14 which may be selectively energized by a plurality of heater wires 16 encapsulated within the assembly 10.

Figure 2:
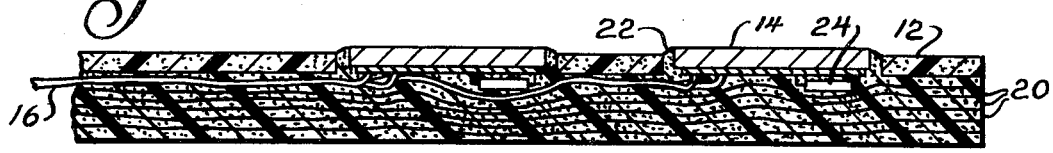
FIG. 2 is a cross-sectional view of one embodiment of the invention taken on line 2—2 of FIG. 1.

FIG. 2 shows a cross-section of a portion of the heater assembly 10. The figure illustrates that the upper surface portion 12 of the assembly has a substantial thickness and contains cut-out portions, formed by routing for example, to accommodate the heater elements 14. The layer 12 is preferably a fully cured or "C" stage laminate formed of three or four layers of glass cloth and epoxy to a thickness of about 0.032". The lower portion of the assembly comprises a plurality of layers 20 which are assembled in stacked relationship relative to the upper portion 12 and the heaters 14 while in their partially cured "pre-preg" or "B" stage condition. Following the application of heat and pressure in a laminating press, the resin and catalyst which is in the "B" stage layers 20 and which is normally dry will liquefy and cross link into a solid thermoset. As the resin flows, much of it will be squeezed out from between the layers and will form a flash (not shown) at the edges of the assembly 10 which may be trimmed away. In the interior of the assembly the resin will flow upwardly around the edges of the heater plates 14 to form a seal 22 relative to the top layer 12. The epoxy in the sealed region 22 will be especially rich and dense since the heater plates 14 are preferably made of metal such as stainless steel and are more thermally conductive than the adjacent portions of the laminate 12. The portions of the "B" stage layers 20 which are close to the heater elements 14 will be brought to a liquid stage faster during the laminating operation than the portions which are more remote from the heater plates. Thus, the epoxy will readily flow initially into the areas immediately around the heater plates so as to create a good seal and lessen the amount of epoxy which will be lost from the edges of the assembly as flash.

Figure 3:
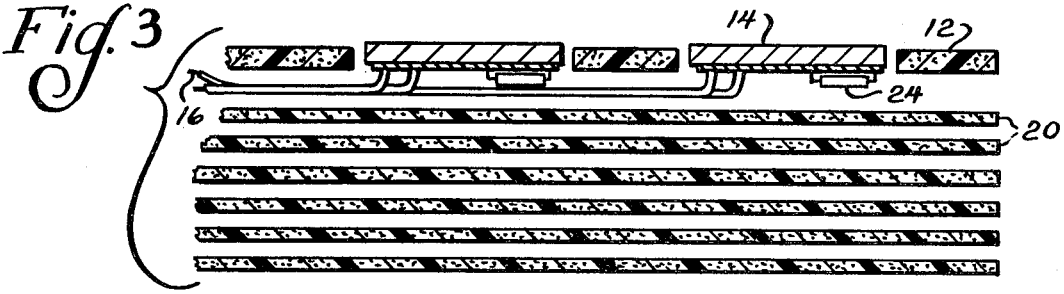
FIG. 3 is an exploded view showing the relationship of the various layers of FIG. 2 before the lamination operation takes place.

In FIG. 3 the layers of the assembly are shown in exploded manner in the form they would assume prior to being laminated together. The lead wires 16 project downwardly from the heater elements 14 as do the thermosensor elements 24 which provide protection in the case of over-heating. Although five layers of "B" stage laminations 20 are shown, in actuality, 15-20 layers might be utilized in order to provide sufficient rigidity and sufficient thickness to accommodate the wiring 16 and the sensing elements 24. There is no need to cut out portions of the layers 20 to accommodate the elements 16,24 since the layers 20 will shift as needed as the resin in them liquefies and moves during the laminating operation.

Figure 4:
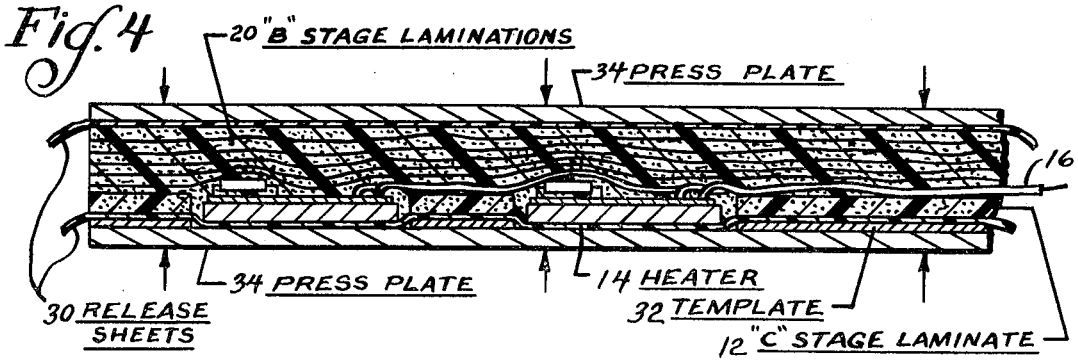
FIG. 4 is a cross-section view illustrating the manner in which the assembly of FIG. 2 is produced in a laminating apparatus.

FIG. 4 illustrates the manner in which the assembly of FIG. 2 is laminated. A release sheet 30 formed of Tedlar or other material which will not adhere to epoxy is placed over a template 32 positioned on top of a lower press plate 34. The template 32 hass a thickness equal to the desired thickness of the heater plates 14 above the surface 12 in FIG. 2. The "C" stage laminate member 12 is then placed over the template 32 and release sheet 30 and the heater members 14 with their lead wires 16 are then laid into the cut-out areas of the laminate 12 and the template 32 and the wires are positioned in their desired location. The "B" stage laminations 20 are then stacked up over the members already in place and are covered with a release sheet 30 which, during the laminating operation, is engaged by the upper press plate member 34. The "C" stage laminate member 12 is preferably made of three or four layers of woven glass cloth and epoxy whereas the "B" stage layers 20 are preferably made of glass mat which is a random mixture of various glass fiber lengths and binders to form a continuous mat. Depending upon the laminate material and the particular type of epoxy and catalyst, or other bonding system used, the temperature and pressure during the lamination process can vary. For example, where glass mat and epoxy laminations are used it is preferred to use between 200-300 psi to prevent the mat from being broken up and forced out of the edges. However, glass cloth and epoxy laminations should be pressed at about 500-1000 psi to prevent voids developing between layers. We prefer to cure for about 20 minutes at 325° F. and then 40 minutes at 350° F. to achieve the most desirable cross linking of the epoxy molecules.

FIG. 5 illustrates a preferred embodiment 40 of the invention which is generally similar to the embodiment of FIGS. 2 and 3 but which includes several novel features for reducing the weight of the heater plate assembly 40. The "C" stage laminate element 12', the heater plates 14', the wiring 16' and the heat sensing elements 24' are identical to the similarly numbered elements in FIG. 3. The remaining laminations are substantially different and include a plurality of "B" stage laminations 44 of glass mat impregnated with epoxy which has been filled as previously described with glass micro-balloons 48. The glass balloons, being hollow, displace epoxy and thus considerably reduce the density of the laminations 44. To further reduce weight, a plurality of plain glass mat laminations 50 which have not been impregnated with epoxy are alternated with laminations 44 in the center of the total assembly 40. The plain glass mat layers 50 of course absorb some of the liquid epoxy from adjacent layers 44 during the laminating operation but, having no epoxy of their own, contribute to the overall weight reduction. Additional weight is saved by cutting out a number of the center layers of laminations 44 and 50 as shown at 54 in regions of the assembly 40 which do not have heater plate elements 14' located above them. For example, such a location might be the upper corner of the assembly 10 shown in FIG. 1. Where it is essential that the assembly 40 be impervious to the penetration of moisture, such as where the assembly must repeatedly be subjected to a sterilizing operation, it is preferable to include an additional bottom outside "B" stage layer 56 which does not have the balloons 48 in its epoxy binder. Laminations 44 with the glass balloons embedded in them do tend to be somewhat porous but the layer 56 is impervious to moisture and provides an effective seal. Preferably, the layer 56 is made of a woven glass cloth rather than a glass mat since the glass cloth is stronger and can cooperate with the woven glass layers which form the upper laminate member 12' to prevent warpage of the overall assembly. An additional "B" stage layer 58, which has been cut out to accommodate the heater plates 14', can be placed above the "C" stage element 12' and laminated to it in order to enhance the seal around the edges of the heater plates 14'. The layer 58 can be provided in a variety of different colors which will improve the esthetic appearance of the assembly and assist in obscuring the view of interior portions of the assembly such as the wires 16' and the cut out area 54.

The assembly of FIG. 5 is preferably assembled and laminated as described in connection with FIG. 4 with the "B" stage laminations 44, 50 being laminated to the "C" stage element 12'. The bottom layer 56 and the top layer 58, where used, are preferably added in a re-pressing operation after the remainder of the assembly has been cured to a "C" stage cure. To avoid crushing the glass balloons 48, the pressure during laminating of the "B" stage layers 44 and 50 to the "C" stage member 12' is preferably limited to about 250 psi. The pressure during the re-pressing to add the glass cloth and epoxy layers 56, 58 is much greater, preferably about 900 psi in order to achieve void free bonding and an esthetically pleasing outer surface.

I claim as my invention:

1. A direct contact heater plate assembly adapted to be periodically and sequentially exposed to containers to be heated and to a hostile atmosphere of steam or very hot water comprising a plurality of superposed laminations which are bonded to each other and to at least one heater portion, said at least one heater portion having a heating means therein and being positioned in a cut-out area formed in at least the uppermost of said plurality of laminations, said at least one heater portion having an upper container contacting surface being surrounded on all its sides by portions of said laminations defining the sides of said cut-out area, said at least one heater portion overlying and being bonded to a portion of at least one lower layer and said uppermost layer of said plurality of laminations, and said at least one heater portion having a greater thermal conductivity through the portion thereof which, during use, is intermediate said heating means therein and the upper container contacting surface thereof than the thermal conductivity of the uppermost laminations which surround said heater portion and are located above the said at least one layer to which the heater portion is bonded.

2. The heater plate assembly of claim 1 wherein said laminations are formed of glass and epoxy resin.

3. The heater plate assembly of claim 2 wherein the amount of resin present per unit of area is greater in the regions of the laminations in the immediate vicinity of the edges of said at least one heater portion than in the regions of the laminations which are remotely spaced from a heater portion.

4. The heater plate assembly of claim 3 wherein the space between said at least one heater portion and the edges of said laminations which define said cut-out area is completely filled with resin.

5. The heater plate assembly of claim 2 wherein the glass in the outermost laminations is in the form of glass cloth while the glass in the innermost laminations is in the form of glass mats.

6. The heater plate assembly of claim 2 wherein some of said laminations include void forming means to reduce their density.

7. The heater plate assembly of claim 6 wherein said void forming means comprises glass micro-balloons.

* * * * *